United States Patent
Faitel

(10) Patent No.: US 6,543,605 B2
(45) Date of Patent: Apr. 8, 2003

(54) HARMONIC LIFT DRIVE SYSTEM FOR A GANTRY CONVEYOR

(75) Inventor: William M. Faitel, New Baltimore, MI (US)

(73) Assignee: Unova IP Corp., Woodland Hills, CA (US)

(*) Notice: Subject to any disclaimer, the term of this patent is extended or adjusted under 35 U.S.C. 154(b) by 0 days.

(21) Appl. No.: 09/878,865

(22) Filed: Jun. 11, 2001

(65) Prior Publication Data

US 2001/0054535 A1 Dec. 27, 2001

Related U.S. Application Data

(60) Provisional application No. 60/211,617, filed on Jun. 14, 2000.

(51) Int. Cl.⁷ ............................................. B65G 43/08
(52) U.S. Cl. ..................... 198/468.6; 414/750
(58) Field of Search ................. 198/468.01, 468.6, 198/774.3; 414/750, 749

(56) References Cited

U.S. PATENT DOCUMENTS

| | | | |
|---|---|---|---|
| 2,196,132 A | 4/1940 | Todd | 214/17 |
| 3,753,489 A | 8/1973 | Tomioka et al. | 198/219 |
| 3,970,191 A | 7/1976 | Oldfield et al. | 198/219 |
| 4,573,862 A | 3/1986 | Anderson | 414/753 |
| 4,666,367 A | 5/1987 | Sticht | 414/751 |
| 4,669,607 A | 6/1987 | Mason | 198/774 |
| 4,865,180 A | 9/1989 | Brems et al. | 198/468 |
| 4,950,128 A | 8/1990 | Sala | 414/796.9 |
| 4,995,505 A | 2/1991 | Takahashi et al. | 198/468.4 |
| 5,549,442 A | 8/1996 | Crorey | 414/751 |
| 5,738,203 A * | 4/1998 | Crorey | 198/468.6 X |
| 5,906,266 A * | 5/1999 | Bungter et al. | 198/468.6 X |
| 6,386,354 B1 * | 5/2002 | Crorey | 198/468.6 X |

FOREIGN PATENT DOCUMENTS

DE  1496876  10/1970

* cited by examiner

Primary Examiner—James R. Bidwell
(74) Attorney, Agent, or Firm—Reising, Ethington, Barnes, Kisselle, Learman & McCulloch, P.C.

(57) ABSTRACT

A gantry conveyor apparatus for transporting components between work stations in an assembly line. The apparatus includes an elevated gantry beam and two gantry carts movably mounted to roll along the beam. The gantry conveyor apparatus also includes a conveyor coupled to each gantry cart. The conveyor moves the carts along the gantry beam between stations in an assembly line. A lift tube is supported on each gantry cart and engages a part at one station, raises the part to an elevated transport position, and lowers and releases the part at a subsequent station. The apparatus also includes a harmonic lift drive coupled to the lift tubes and drives the lift tubes using a single motor rather than a separate motor at each lift.

16 Claims, 6 Drawing Sheets

HARMONIC LIFT DRIVE SYSTEM FOR A GANTRY CONVEYOR

CROSS-REFERENCE TO RELATED APPLICATIONS

Applicant claims the benefit of U.S. Provisional Application Ser. No. 60/211,617, filed Jun. 14, 2000.

BACKGROUND OF THE INVENTION

1. Field of the Invention

The invention relates to a gantry conveyor apparatus and, more specifically, a gantry conveyor apparatus having multiple lift tubes.

2. Description of the Related Art

Gantry conveyor systems used in the manufacture and assembly of automotive vehicles are well known in the art. Gantry conveyor systems are used as material handling devices to pick up components, such as vehicle frames, at one station and transport the components to a subsequent station along an assembly line. A gantry system generally comprises an elevated gantry beam and a plurality of gantry carts movably mounted to roll along the beam between assembly line stations. Each gantry cart supports a lift tube assembly. The lift tube assemblies are each designed to pick up a part at a station then raise the part from the station to an elevated transport position. Once in the transport position the attached part is carried by the gantry cart along the gantry beam to a position above a subsequent station along the assembly line. Once positioned above the subsequent station the lift tube lowers the attached part to the subsequent station and releases it there. In the prior art, each lift tube assembly includes its own dedicated electric or hydraulic motor that raises and lowers the lift tube on that assembly. The inclusion of an electric or hydraulic motor to drive each lift tube assembly results in a relatively complex and costly system.

FIG. 1 shows a typical prior art gantry system 10. Gantry legs 11 are used to support a gantry beam 12 above the shop floor. Typically, the gantry beam 12 is located 8 to 13 feet above the floor. Lift tubes 13 are mounted on the gantry beam 12 and are powered by a motor 14 to translate back and forth along the beam 12 to pickup and place parts at workstations on the shop floor. As shown, the gantry system 10 would service four workstations, one located beneath each of the lift tubes 13, and one located to the right of the lift tube that is furthest right on the gantry beam 12. Tooling such as a component gripper (not shown) is attached to a mounting plate on the lower end of each lift tube 13. The tooling is used to secure a part for transfer from one workstation to the next. In hemming applications, the tooling may also be used to secure a part in the hemming die for hemming. A separate motor (not shown) is provided for each of the lift tubes 13 to raise and lower the lift tubes.

Gantry systems are known to employ counterbalance systems to reduce the effective load that the lift tube motors must lift. Some gantry systems use mechanical counterbalance weights. Other gantry systems use air (pneumatic) counterbalance systems. In each case, components of the counterbalance system travel with each gantry cart. For example, in a mechanical system, a counterbalance weight is coupled with each lift tube on each gantry cart.

In air counterbalance systems, a surge tank and a pneumatic counterbalance cylinder travel with each cart. The purpose of each surge tank is to increase the volume capacity of the pressurized side of its associated pneumatic counterbalance cylinder. The increase in the volume capacity reduces the pressure differential when a counterbalance cylinder is in different working positions. It's typical for the volume of a surge tank in such a system to be 10 times the maximum volume of its associated counterbalance cylinder. Each such air counterbalance system requires a feed line and an air regulator to supply air to make up for any losses that may occur in the system because of leaky connections and worn seals. Air counterbalance systems also have the disadvantage that the pneumatic levels and flow rates in the various parts of such systems are difficult to balance once the original factory set balance has been altered.

It would be desirable to reduce the complexity and, the cost of gantry conveyor lift systems.

BRIEF SUMMARY OF THE INVENTION

The invention is embodied in a gantry conveyor apparatus for transporting a plurality of components between workstations in an assembly line. The apparatus includes an elevated gantry beam and at least two gantry carts movably mounted to roll along the beam. The apparatus also includes a conveyor that is coupled to each gantry cart and is configured to move the carts along the gantry beam between stations in an assembly line. A lift is supported on each gantry cart and is configured to engage a part at one station, raise the part to an elevated transport position, and lower and release the part at a subsequent station.

The gantry conveyor apparatus also includes a harmonic lift drive coupled to the lifts and configured to drive the lifts using a single motor. A gantry conveyor apparatus constructed according to the invention is, therefore, able to move parts using a single lift motor rather than requiring a separate motor at each lift.

Objects, features and advantages of this invention include a harmonic drive system for a gantry in which multiple lift tubes can be powered by a single motor, in which the cost of the gantry is reduced through the use of a single lift drive for the entire gantry system; in which a simple mechanical or pneumatic counterbalance can be used; in which a passive lock-up is provided for the lift tubes in the raised position while the gantry carts travel between work stations; and in which a passive lock-up can be designed to use the existing lower horizontal guide rail that guides the gantry carts.

BRIEF DESCRIPTION OF THE SEVERAL VIEWS OF THE DRAWINGS

These and other objects, features and advantages of this invention will be apparent from the following detailed description of the preferred embodiment(s) and best mode, appended claims, and accompanying drawings in which:

DESCRIPTION OF THE PREFERRED EMBODIMENT

Figure 10:
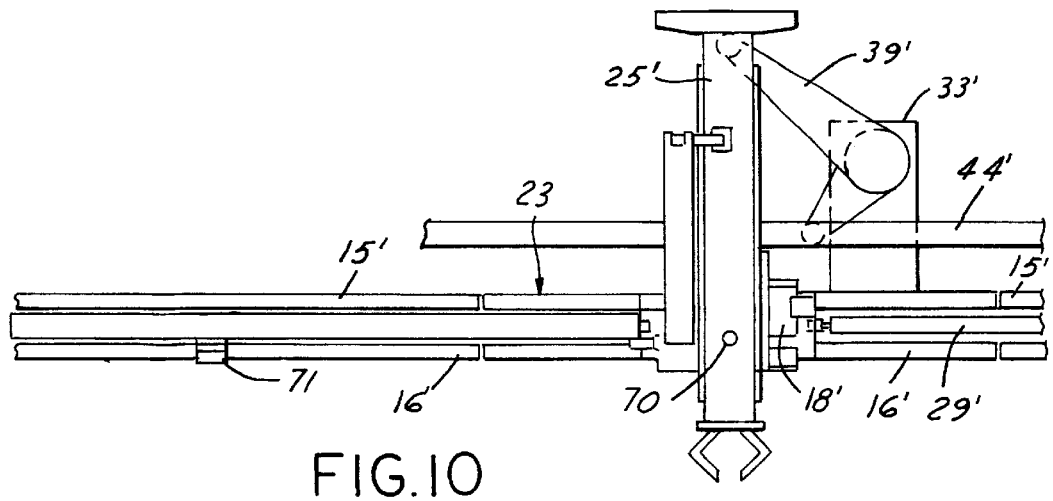
FIG. 10 is a partial side view of a gantry system constructed according to a second embodiment of the invention and showing lower gantry cart guide rails used as lift tube support rails.
Figure 13:
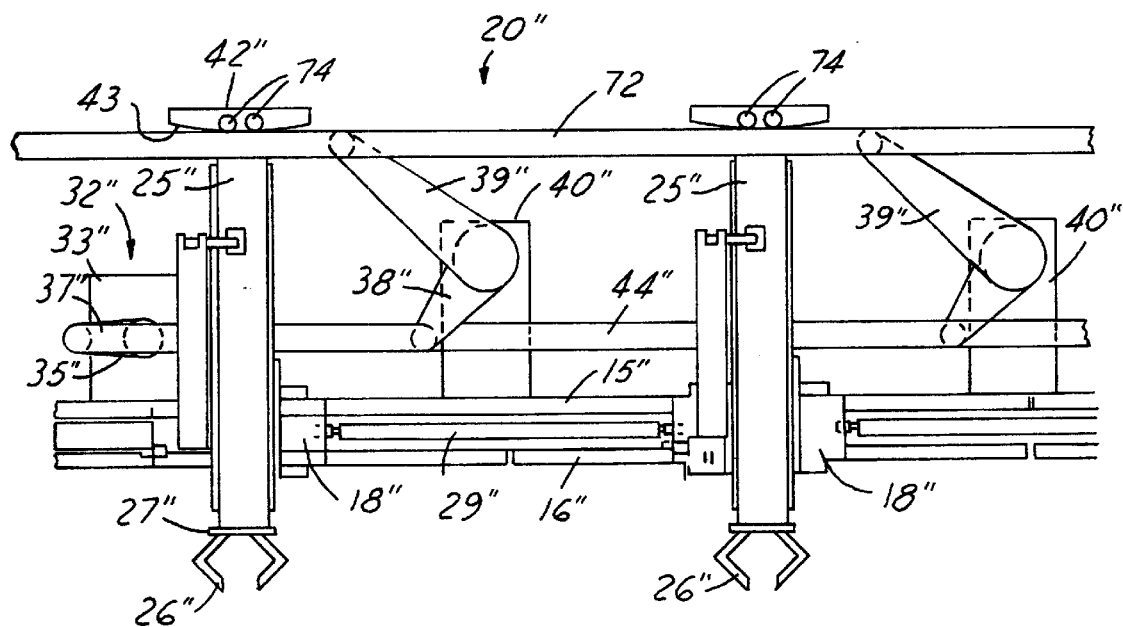
FIG. 13 is a side view of a gantry system constructed according to the invention and showing lift tubes of the gantry system in a raised position.
Figure 14:
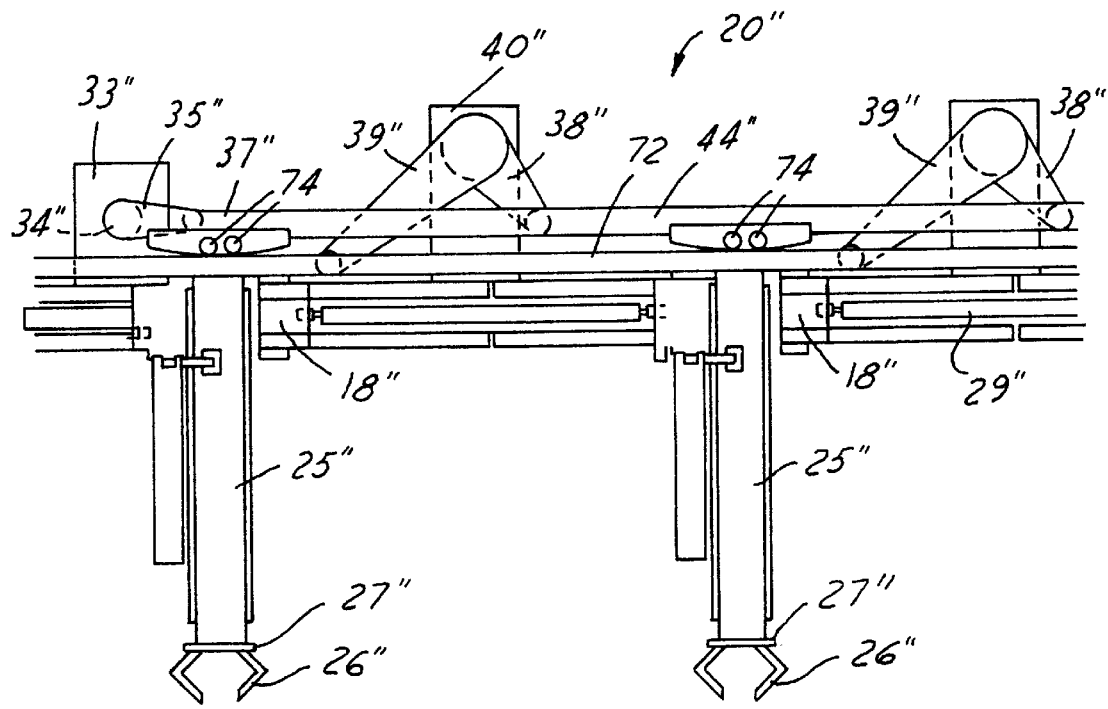
FIG. 14 is a side view of the gantry system of FIG. 1 showing the lift tubes in a lowered position.

A gantry system 20 constructed according to the invention is shown in FIGS. 2–7. A gantry system 20' constructed according to a second embodiment of the invention is shown in FIG. 10 and a gantry system 20" constructed according to a third embodiment of the invention is shown in FIGS. 13 and 14. Reference numerals with the designation prime (') in FIG. 10 and double-prime (") in FIGS. 13 and 14 indicate alternative configurations of elements that also appear in the first embodiment. Unless indicated otherwise, where a portion of the following description uses a reference numeral to refer to the figures, I intend that portion of the description to apply equally to elements designated by primed numerals in FIG. 10 and double-primed numerals in FIGS. 13 and 14.

Figure 1:
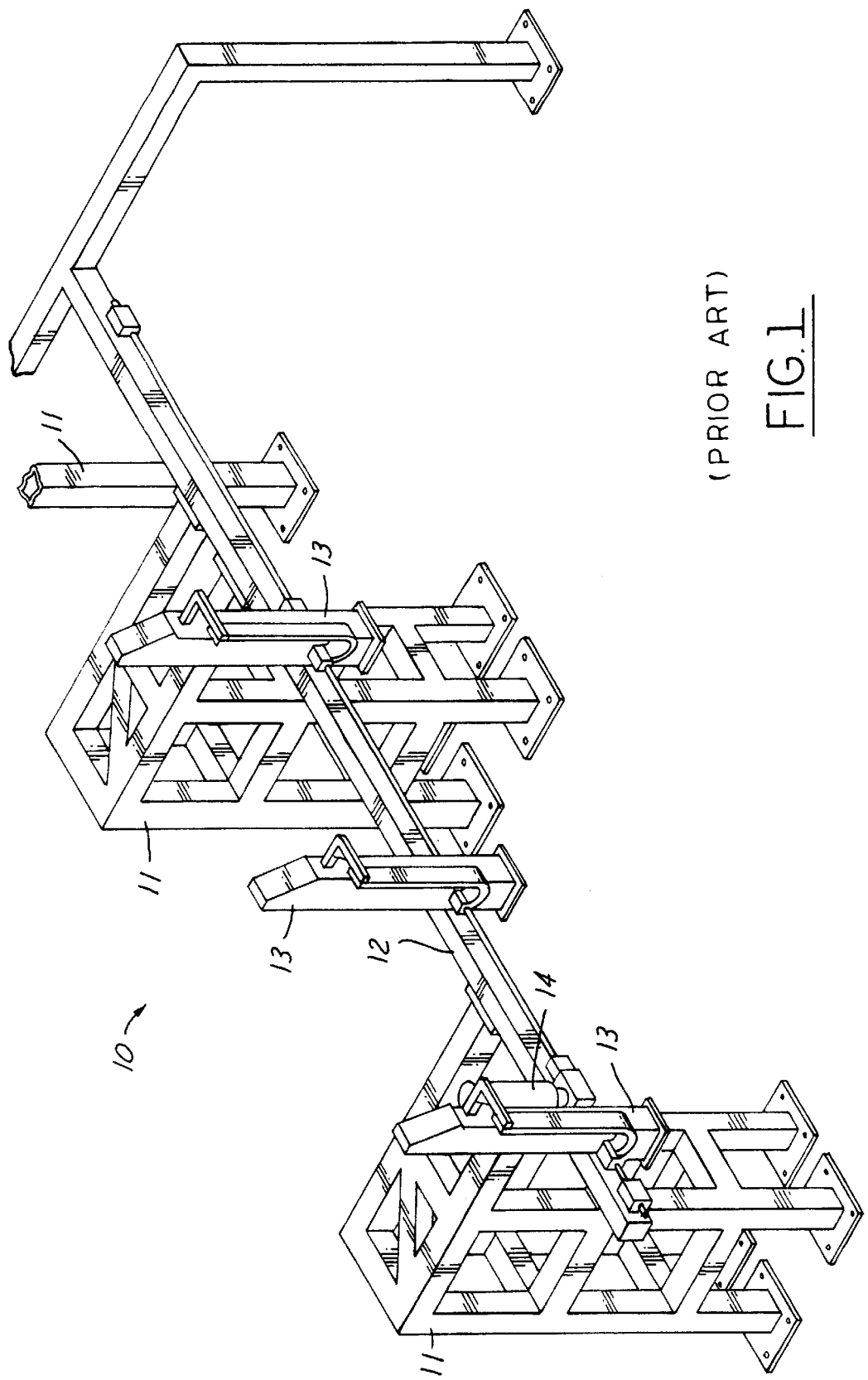
FIG. 1 is an overhead perspective view of a prior art gantry system.

As with the prior art gantry system 10 shown in FIG. 1, a gantry system 20 constructed according to the invention includes a stationary overhead gantry beam 23 and lift tubes 25 movably mounted on the gantry beam 23. A motor (not shown) is drivingly connected to the lift tubes 25 and laterally translates the tubes 25 back and forth along the beam 23 to transport workpieces or parts between different workstations. Tooling such as a component gripper 26 is attached to a mounting plate 27 on the lower end of the lift tube 25. The tooling 26 is used to secure a part for transfer from one workstation to the next. In hemming applications, the tooling 26 may also be used to secure a part in the hemming die for hemming. The lift tubes are also movably supported for generally vertical reciprocal motion relative to the gantry beam 23 to allow the tubes to pick up parts for transport and to lower parts for placement.

Upper and lower guide rails 15 and 16 are mounted on a front face of the gantry beam 23, and support the gantry carts 18 for lateral motion along the gantry beam 23. A lift tube 25 is mounted on each gantry cart 18, and a mounting plate 27 on the bottom of each lift tube 25 receives the tooling 26 that is used to grip and carry a workpiece. Tie tubes 29 couple together adjacent gantry carts 18 for movement along the gantry beam 23.

Figure 2:
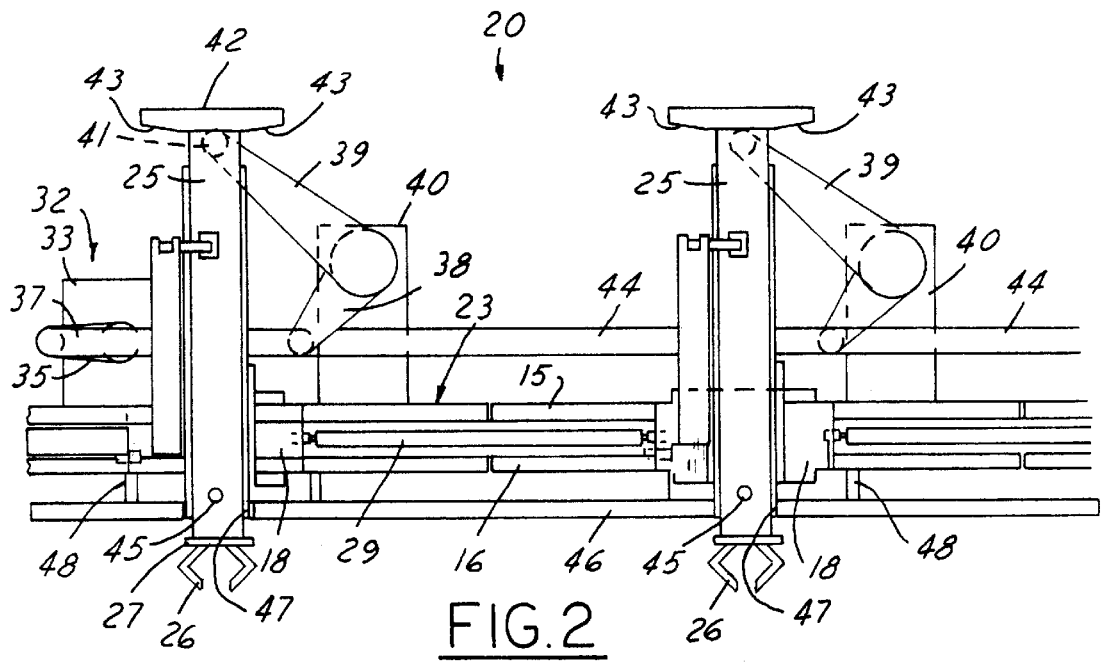
FIG. 2 is a side view of a gantry system constructed according to the invention and showing lift tubes of the gantry system in a raised position.

FIG. 2 shows the lift tubes 25 in the raised position. The lift tubes are raised and lowered by a harmonic lift drive assembly 32. The harmonic lift drive assembly 32 comprises a single electric motor and reducer gear combination 33 connected to the lift tubes by a lift drive linkage. The lift drive linkage includes a drive arm 35, a drive link 37 and drag link 44, multiple lift arms 39, lift rollers 41 and lift plates 42 for each lift tube 25. The drive arm 35 is attached to an output shaft 34 of the reducer gear. The drive arm 35 is pivoted to one end of a drive link 37. In FIG. 2, the drive arm 35 and the drive link 37 are shown in a folded position. The other end of the drive link 37 is pivoted to the lever arm portion 38 of a lift arm 39. The lift arms 39 are pivoted to lift arm supports 40 that are mounted on the gantry beam 23. A lift roller 41 is mounted on the end of the each arm 39. The lift roller 41 engages the underside of a lift plate 42 that is attached to the lift tube 25. The lift plate 42 is formed with beveled, lead-in sections 43 on either side thereof.

The drive assembly 32 is able to actuate all the lift arms 39 by using the drag link 44 to tie the multiple lever arms 38 together. A support roller 45 is mounted on each respective lift tube 25 in a position to be above the level of a support rail 46 when the lift tube 25 is in the raised position. Gaps 47 are formed in the support rail 46 in vertical alignment with work stations to allow the lift tube support rollers 45 to pass through the gaps 47 in the rail 46 so that the lift tubes 25 can be lowered. The support rail 46 is mounted to the gantry beam by means of support rail brackets 48.

Figure 3:
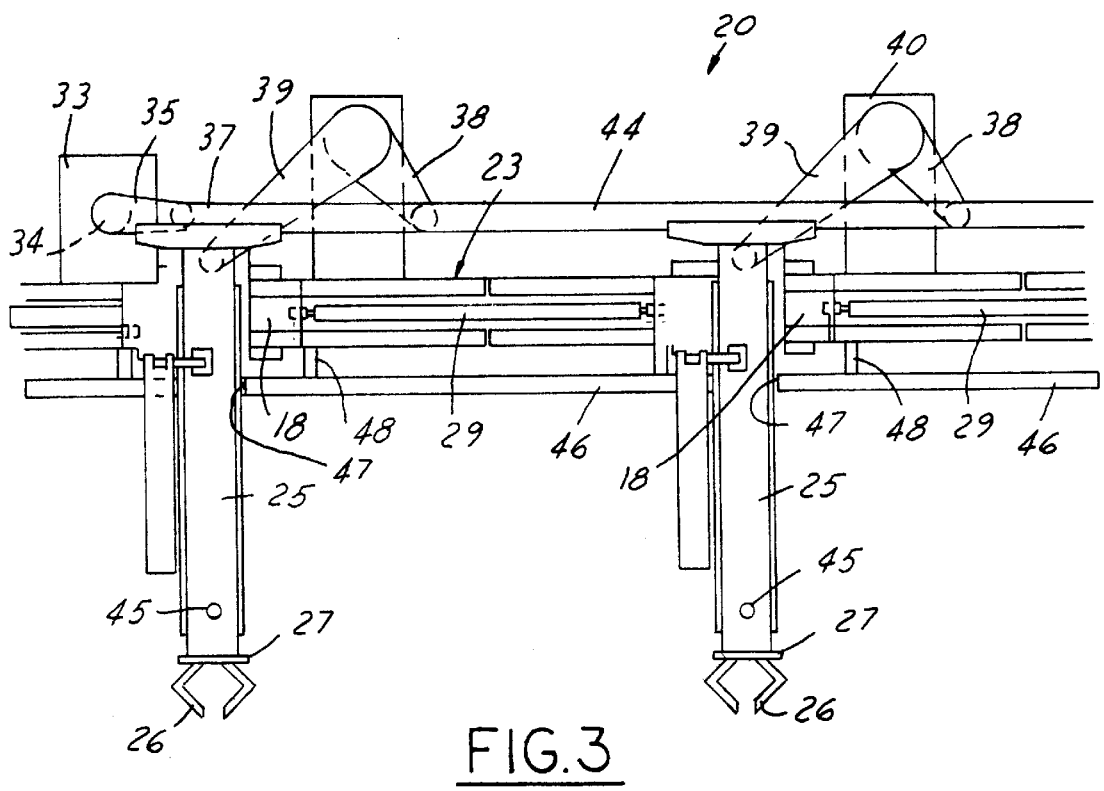
FIG. 3 is a side view of the gantry system of FIG. 2 showing the lift tubes in a lowered position.

FIG. 3 shows the lift tubes 25 in the lowered position. To lower the lift tubes, the motor-gear reducer 33 rotates the output shaft 34 and the drive arm 35 until the drive arm 35 and the drive link 37 are in the extended position as shown. The motion of the drive link 37 to the right rotates the lever arm portion 38 and lift arm 39 counterclockwise, lowering the lift roller 41. At the same time, the drag link 44 causes all of the lift arms 39 to undergo the same motion. This lowers all of the lift tubes 25 and the mounting plates 27 that the tooling 26 and workpieces are attached to.

To raise the lift tubes, the motor and gear reducer 33 rotate the output shaft 34 and the drive arm 35 so that the drive arm 35 and the drag link 37 return to the folded position as shown in FIG. 2. The motion of the drive link 37 to the left rotates the lever arm portion 38 and lift arm 39 clockwise, raising the lift roller 41. This motion is tied to all of the lift arms by the drag link 44, and raises all of the lift tubes 25.

Figure 4:
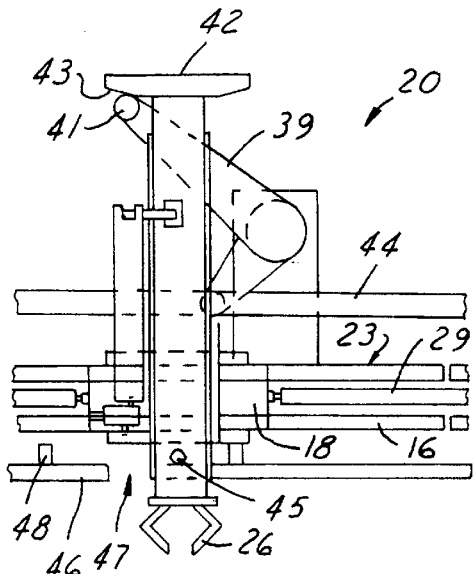
FIG. 4 is a side view of the gantry system of FIGS. 2 and 3 showing a lift tube and a drive cart starting to advance to a work station.

As the gantry carts transfer the lift tubes to the next workstation, the lift tube assemblies remain in the raised position as shown in FIG. 4. Before the lift plate 42 disengages from the lift roller 41, the support roller 45 engages the support rail 46 to maintain the lift tube 25 in a raised position. The lift support roller 45 maintains the lift tube in the raised position as it travels to the next workstation.

Figure 5:
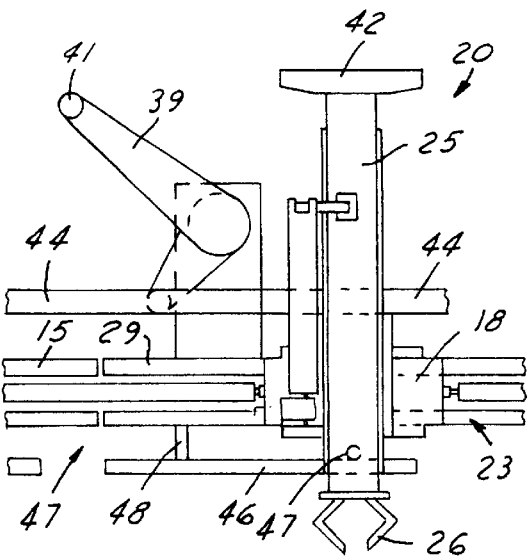
FIG. 5 is a side view of the gantry system of FIGS. 2–4 showing a lift tube and drive cart between workstations.

As shown in FIG. 5, the support rail 46 supports the lift tube support roller 45 while the gantry cart translates the lift tube 25 to the next work station, holding the lift tube 25 in the raised position.

Figure 6:
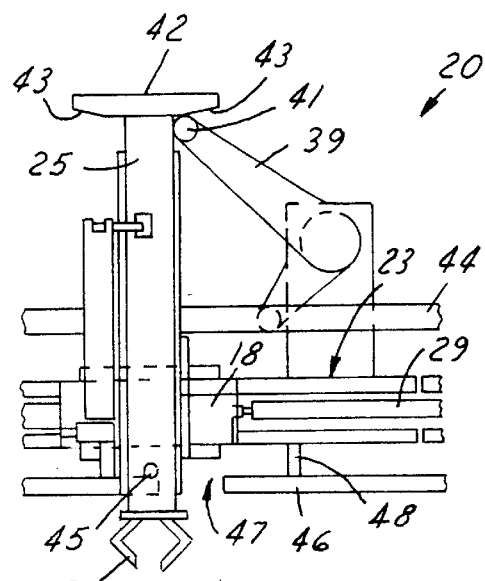
FIG. 6 is a side view of the gantry system of FIGS. 2–4 showing the lift tube and drive cart of FIG. 5 entering a work station.

As shown in FIG. 6, as the lift tube 25 approaches the next workstation, the lift roller 41 engages the tapered lead-in section 43 on the underside of the lift plate 42. The lift roller 41 engages the lead-in section 43 of the lift plate 42 before the lift tube support roller 45 reaches the gap in the support rail 46.

Figure 7:
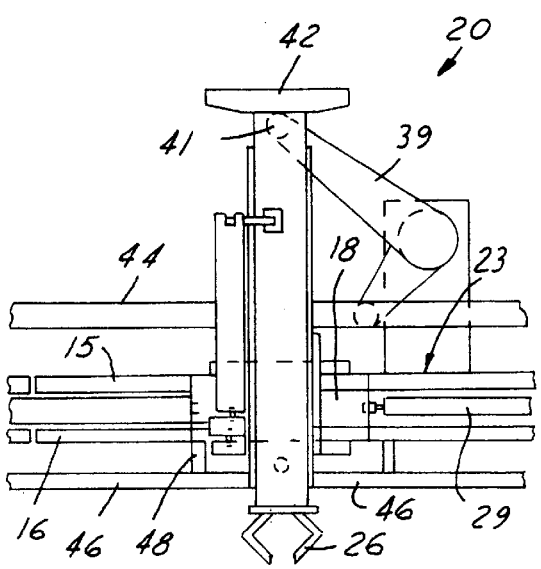
FIG. 7 is a side view of the gantry system of FIGS. 2–5 showing the lift tube and drive cart of FIGS. 5 and 6 after having arrived at the work station.

FIG. 7 shows the lift tube 25 at the next workstation. The lift roller 41 is centered on the underside of the lift plate 42 to fully support the lift tube 25. The lift tube support roller 45 is centered over a gap 47 in the support rail 46 so that the lift tube can be lowered to pick-up or place a part in the work station.

Figure 8:
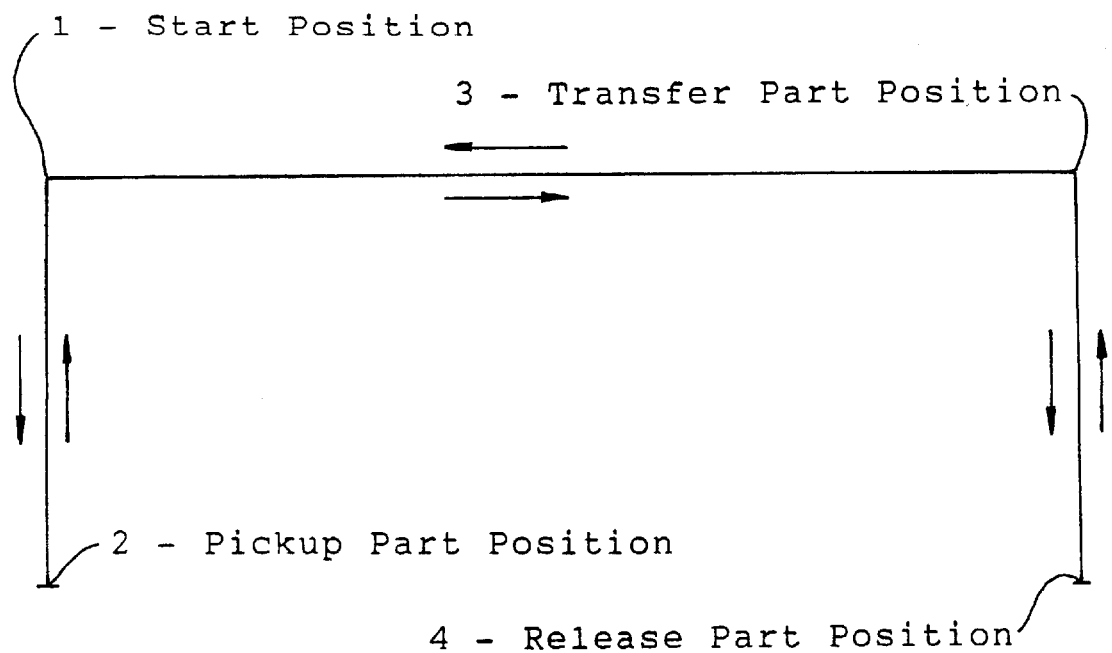
FIG. 8 is a graphical representation of a front view of the reciprocating path of gantry lift tubes and tooling of the gantry system of FIGS. 2–7.

As shown in FIG. 8, a lift tube 25 starts above the first workstation at a Start Position 1, and is then lowered to a Pickup Part Position 2. In normal operation, the tooling 26 grips a part at the Pickup Part Position 2 and then returns with the part to the Start Position 1 The gantry cart then translates the lift tube 25, the tooling 26, and the part to a Transfer Part Position 3, above the second workstation. After the gantry cart reaches the Transfer Part Position 3 the lift tube, tooling 26 and part are lowered to a Release Part Position 4. The tooling 26 releases the part at the Release Part Position 4 and then the empty tooling 26 is raised back to the Transfer Part Position 3. The gantry cart then returns the lift tube to the Start Position 1. The cycle then begins to repeat as the lift tube lowers to the Pickup Part Position 2 to engage another part.

Figure 9:
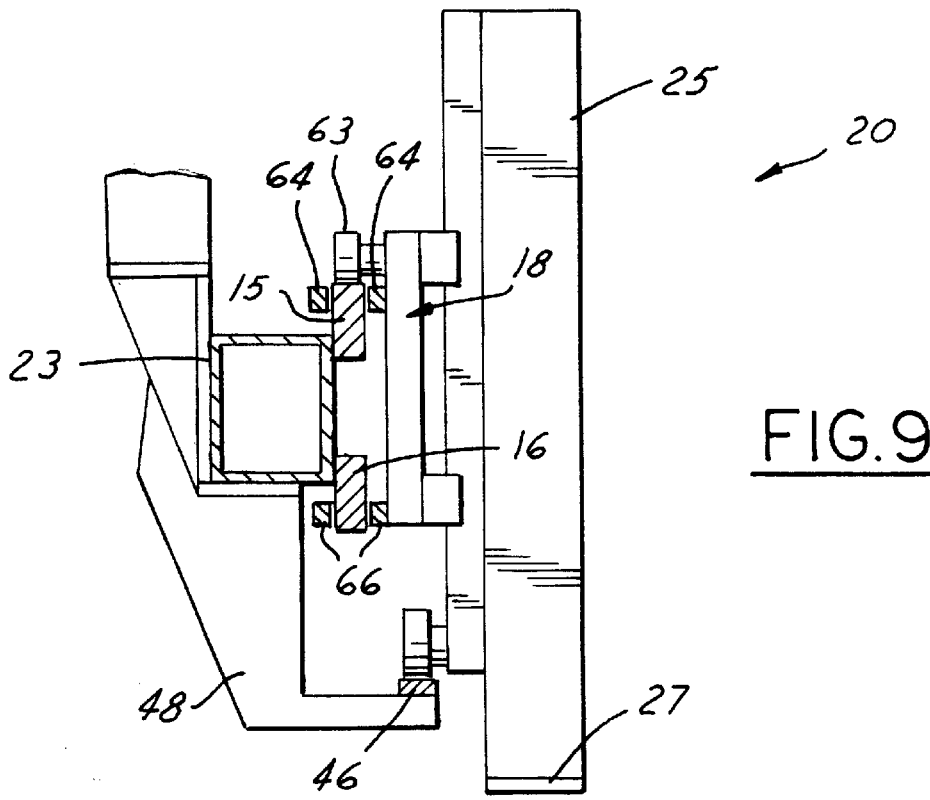
FIG. 9 is a partial end view of the gantry system of FIGS. 2–7 showing a gantry cart lift tube supported on the gantry beam.

As shown in FIG. 9 the upper and lower guide rails 15, 16 are mounted on the front face of the gantry beam 23. A roller 63 mounted on the gantry cart 18 rides on the upper rail 15 to support the gantry cart and lift tube on the gantry beam. Upper guide bearings 64 mounted on the gantry cart 18 maintain the roller centered on the upper rail 15. Lower guide bearings 66 mounted on the gantry cart 18 engage both sides of the lower guide rail 16 to provide stability for the gantry cart and lift tube 25.

In the second embodiment of the system shown in FIG. 10, a lower gantry guide rail 16' is used as the support rail for a lift tube support roller 70. Gaps 71 in the lower gantry cart guide rail 16' correspond to the position of the lift tube support roller 70 when the lift tube 25' is at a work station and allow the support roller 70 to pass through the cart rail 16' so that the lift tube 25' can be lowered. The support roller 70 rides on the lower gantry cart guide rail 16' while the gantry cart is transferring from one workstation to the next. This construction allows the elimination of separate support rails 46 and the associated support brackets 48 as shown in FIGS. 2–7, 9,11 and 12. This embodiment includes guide bearings (not shown) that support the gantry cart 18' on either side of the gap 71 to prevent the gantry cart 18' from cocking at the workstations.

According to the invention, one lift drive assembly 32 is required for an entire gantry system, and one lift arm 39 and lift arm support 40 is required at each workstation. The lift drive system 32 is not limited to a motor and gear reducer with a crank arm as shown. The drive system could comprise any other suitable drive system such as a single drive cylinder powered with air or hydraulic fluid, a servo driven rack and pinion, or a ball screw.

One advantage of a harmonic lift drive system constructed according to the invention is that the whole system can be mechanically counterbalanced through the use of a counterweight that is coupled to the lift drive linkage and positioned to reduce the effective loading on the motor by offsetting the weight of parts supported by the lifts. The system can also be counterbalanced with a single air counterbalance cylinder attached to the drag link 44.

Figure 11:
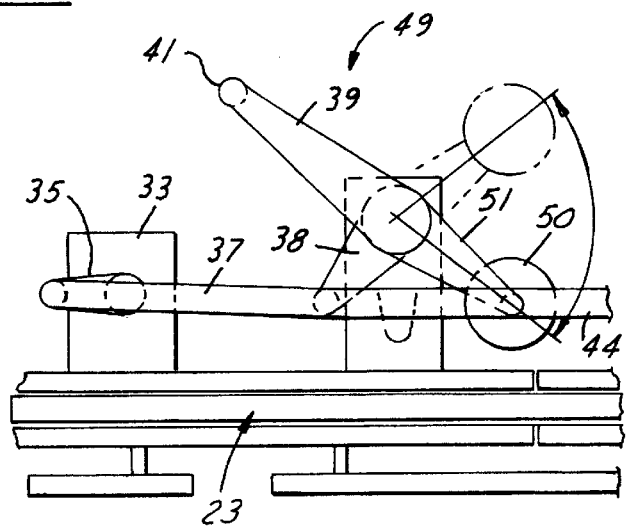
FIG. 11 is a side view of a mechanical counterbalance system installed in a gantry lift system constructed according to the invention.

FIG. 11 shows a mechanical counterbalance system 49 in which a counterbalance weight 50 is attached to a counterbalance arm 51 that extends from a harmonic lift arm 39. The value of the counterbalance weight is computed by adding the total weight of the lift tubes and any lift tube tooling 26 to one half the total weight of a typical load carried by the gantry system. This sum is known as the effective load. The effective load is then multiplied by the length of the lift arm 39, and divided by the length of the counterbalance arm. This computation provides the total counterbalance weight. The value of each counterbalance weight to be mounted on each counterbalance arm is then computed by dividing the total counterbalance weight by the number of lift arm assemblies.

The mechanical counterbalance system 49 shown in FIG. 11 uses a counterweight 50 on the end of each counterbalance arm 51. The purpose of the counterbalance system is to reduce the effective load that the motor and gear reducer 33 must lift. An advantage of this type of counterbalance system is that evenly distributing the counterweights 50 among the lifter assemblies minimizes the load transferred through the drag link 44. Another advantage is that a mechanical counterbalance system requires very little maintenance. This is because, once the counterbalance weights are in place, they do not require service or further adjustments.

Figure 12:
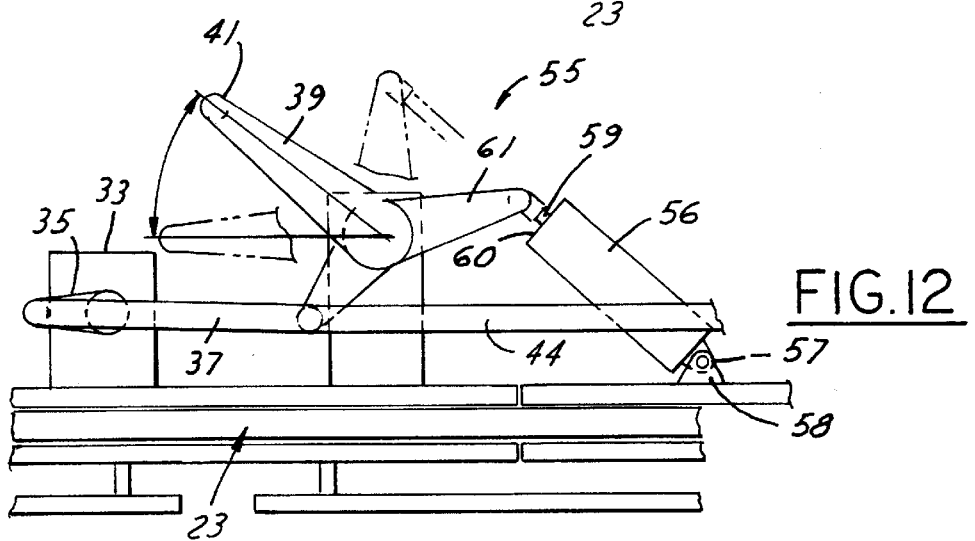
FIG. 12 is a side view of an air counterbalance system installed in a gantry lift system constructed according to the invention.

FIG. 12 shows a pneumatic counterbalance system 55 used with the harmonic lift tube system of the present invention. A pneumatic counterbalance system has the advantage that one cylinder 56 is used to counterbalance the whole drive system. One end 57 of the cylinder 56 is pivotally mounted to a bracket 58 that is mounted to the gantry beam 23. A rod 59 that extends from the rod end 60 of the cylinder is pivotally mounted to an extension 61 of the lift arm 39. Since, in this arrangement, the counterbalance load is transmitted through the drag link 44; the drag link must be appropriately sized. In the embodiment shown, the rod end 60 of the cylinder is pressurized, while the other end is vented to atmosphere, so that the pressure in the system pulls the rod 59 into the cylinder 56. Unlike prior art pneumatic counterbalance systems, the cylinder 56 does not travel with the gantry cart, and as a result, the surge tank (not shown) can be mounted on the gantry beam 23 in a stationary position. Additionally, the mass of the cylinder 56 and the rod 59 is less than the mass of mechanical counterbalance weights 50 shown in FIG. 11, and as a result, the pneumatic counterbalanced system has less mass to move than a mechanically counterbalanced system.

As shown in FIGS. 13 and 14, in the third embodiment of the gantry conveyor apparatus, the motor 14" is supported stationary relative to a gantry beam 12" and is drivingly coupled to a plurality of lifts 25" through a lift drive linkage as in the first and second embodiments. Also similar to the first two embodiments, the lift drive linkage comprises a harmonic drive arm 35" that is pivotally coupled to a drive link 37" that is pivotally coupled to a plurality of lift arms 39" through a series of drag links 44". However, unlike the first and second embodiments, in the apparatus of FIGS. 13 and 14 the lift arms 39" drivingly engage a generally horizontal lift rail 72 in a parallel manner. The lift arms 39" drive the lift rail 72 through reciprocal vertical motion. The lifts 25" are supported on respective rollers 74 on the lift rail 72 and are supported on the lift rail 72 for simultaneous reciprocal vertical movement with the lift rail. The lift arms 39" engage the lift rail 72 in a parallel manner such that simultaneous reciprocal rotational lift arm motion alternately raises and lowers the lift rail 72 in a generally horizontal attitude. Because the lift rail 72 supports the lifts 25" for vertical reciprocal movement, the embodiment of FIGS. 13 and 14 does not require a support rail 46 to support the lifts in their raised positions. In addition, the lift rail reduces the number of lift arms necessary to raise and lower the lifts.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. A gantry conveyor apparatus for transporting a plurality of components between work stations in an assembly line, the apparatus comprising:
   a stationary elevated gantry beam;
   at least two gantry carts movably mounted to roll along the beam;
   a conveyor coupled to each gantry cart and configured to move the carts along the gantry beam between stations in an assembly line;
   a lift supported on each gantry cart and configured to engage a part at one station, raise the part to an elevated transport position, and lower and release the part at a subsequent station; and
   a harmonic lift drive coupled to the lifts and configured to drive the lifts using a single motor.

2. A gantry conveyor apparatus as defined in claim 1 in which the single motor is supported stationary relative to the gantry beam and is coupled to the lifts through a lift drive linkage comprising a harmonic drive arm and a drive link, the drive link being coupled directly to a first lift arm and through a drag link to an additional lift arm, each lift arm engaging a lift such that rotation of the lift arm raises respective lifts.

3. A gantry conveyor apparatus as defined in claim 2 in which the drive link is coupled directly to a first lift arm and through a series of drag links to additional lift arms, each lift arm engaging a lift such that rotation of the lift arms raises and lowers the respective lifts.

4. A gantry conveyor apparatus as defined in claim 1 in which:
   the apparatus includes a plurality of gantry carts movably mounted to roll along the beam;
   the conveyor is coupled with each cart of the plurality of gantry carts and is configured to move each cart of the plurality of carts along the gantry beam between assembly line stations; and
   a lift is supported on each gantry cart and is configured to engage a part at one station, raise the part to an elevated transport position, and lower and release the part at a subsequent station.

5. A gantry conveyor apparatus as defined in claim 1 in which:
   the motor is supported stationary relative to the gantry beam;
   the motor is drivingly coupled to the lifts through a lift drive linkage;
   the lift drive linkage comprises a harmonic drive arm coupled to a drive link;
   the drive link is coupled to a first lift arm;
   the first lift arm drivingly engages a generally horizontal lift rail and is configured to drive the lift rail through reciprocal vertical motion; and
   the lifts are supported on the lift rail for simultaneous reciprocal vertical movement.

6. A gantry conveyor apparatus as defined in claim 5 in which:
   the drive link is coupled through a drag link to an additional lift arm; and
   the first lift arm and the additional lift arm engage the lift rail such that lift arm motion alternately raises and lowers the lift rail.

7. A gantry conveyor apparatus as defined in claim 5 in which the drive link is coupled through a series of drag links to a plurality of additional lift arms; and
   the lift arms engage the lift rail in a parallel manner such that motion of the lift arms alternately raises and lowers the lift rail.

8. A gantry conveyor apparatus as defined in claim 1 in which the harmonic lift drive includes a counterbalance coupled to the lift drive system and configured to reduce effective loading on the motor by providing a counterbalance load to offset the weight of parts attached to the lifts.

9. A gantry conveyor apparatus as defined in claim 8 in which the counterbalance includes a counterbalance weight coupled to the lift drive linkage such that a counterbalance load provided by the weight is transmitted through the drive linkage to more than one lift.

10. A gantry conveyor apparatus as defined in claim 9 in which the counterbalance includes only a single weight that is supported on a counterbalance arm that extends from one of the lift arms.

11. A gantry conveyor apparatus as defined in claim 8 in which the counterbalance includes an air counterbalance cylinder coupled to the lift drive linkage such that a counterbalance load provided by the cylinder is transmitted through the drive linkage to more than one lift.

12. A gantry conveyor apparatus as defined in claim 11 in which one end of the cylinder is connected to the stationary gantry beam and an opposite end of the cylinder is connected to the lift drive linkage.

13. A gantry conveyor apparatus as defined in claim 11 in which the counterbalance includes a stationary surge tank connected to the cylinder and configured to increase the volume capacity of a pressurized side of the cylinders.

14. A gantry conveyor apparatus as defined in claim 1 in which the apparatus includes a passive lock-up configured to hold the lifts in the raised position while the gantry carts travel between work stations and to release the lifts for lowering when the gantry carts are at work stations.

15. A gantry conveyor apparatus as defined in claim 14 in which the passive lockup includes a lower horizontal guide rail of the gantry beam and is configured to support the gantry carts by engaging gantry cart rollers between work stations, the separate guard rail having gaps at the work stations where the guard rail does not support the cart roller.

16. A gantry conveyor apparatus as defined in claim 14 in which the passive lock-up includes a separate guard rail spaced from and supported parallel to the gantry beam and configured to support the gantry carts by engaging gantry cart rollers between work stations, the separate guard rail having gaps at the work stations where the guard rail does not support the cart roller.

* * * * *